United States Patent
Berger et al.

(10) Patent No.: US 8,077,036 B2
(45) Date of Patent: Dec. 13, 2011

(54) SYSTEMS AND METHODS FOR SECURITY BREACH DETECTION

(75) Inventors: Theodore W. Berger, Rancho Palos Verdes, CA (US); Alireza Dibazar, Los Angeles, CA (US); Ali Yousefi, Los Angeles, CA (US); Hyung O. Park, Torrance, CA (US)

(73) Assignee: University of Southern California, Los Angeles, CA (US)

( * ) Notice: Subject to any disclaimer, the term of this patent is extended or adjusted under 35 U.S.C. 154(b) by 502 days.

(21) Appl. No.: 12/244,549

(22) Filed: Oct. 2, 2008

(65) Prior Publication Data

US 2009/0309725 A1 Dec. 17, 2009

Related U.S. Application Data

(60) Provisional application No. 60/977,273, filed on Oct. 3, 2007.

(51) Int. Cl.
*G08B 13/00* (2006.01)

(52) U.S. Cl. ........ 340/566; 340/565; 340/544; 340/522; 340/943; 356/486; 356/502

(58) Field of Classification Search .................. 340/566, 340/565, 544, 522, 943; 356/486, 502; 367/135, 367/136
See application file for complete search history.

(56) References Cited

U.S. PATENT DOCUMENTS

| | | | |
|---|---|---|---|
| 4,110,730 A | 8/1978 | Varecka | |
| 5,021,766 A * | 6/1991 | Genahr et al. | 340/544 |
| 5,083,304 A | 1/1992 | Cahill | |
| 5,477,324 A * | 12/1995 | Berthelot et al. | 356/486 |
| 5,774,846 A | 6/1998 | Morii | |
| 5,973,998 A | 10/1999 | Showen et al. | |
| 6,014,447 A | 1/2000 | Kohnen et al. | |
| 6,135,965 A | 10/2000 | Tumer et al. | |

(Continued)

FOREIGN PATENT DOCUMENTS

WO 2009046359 A2 4/2009

(Continued)

OTHER PUBLICATIONS

Dibazar, A. et al. The Application of Dynamic Synapse Neural Networks on Footstep and Vehicle Recognition. Neural Networks, 2007. IJCNN 2007. International Joint Conference on Neural Networks, Orlando, Florida, USA, pp. 1842-1846, Aug. 12-17, 2007.

(Continued)

*Primary Examiner* — Tai T Nguyen
(74) *Attorney, Agent, or Firm* — McDermott Will & Emery LLP

(57) ABSTRACT

A system for detecting and classifying a security breach may include at least one sensor configured to detect seismic vibration from a source, and to generate an output signal that represents the detected seismic vibration. The system may further include a controller that is configured to extract a feature vector from the output signal of the sensor and to measure one or more likelihoods of the extracted feature vector relative to set $\{b_i\}$ ($i=1, \ldots, i_{max}$) of breach classes $b_i$. The controller may be further configured to classify the detected seismic vibration as a security breach belonging to one of the breach classes $b_i$, by choosing a breach class within the set $\{b_i\}$ that has a maximum likelihood.

25 Claims, 8 Drawing Sheets

U.S. PATENT DOCUMENTS

Figure 1:
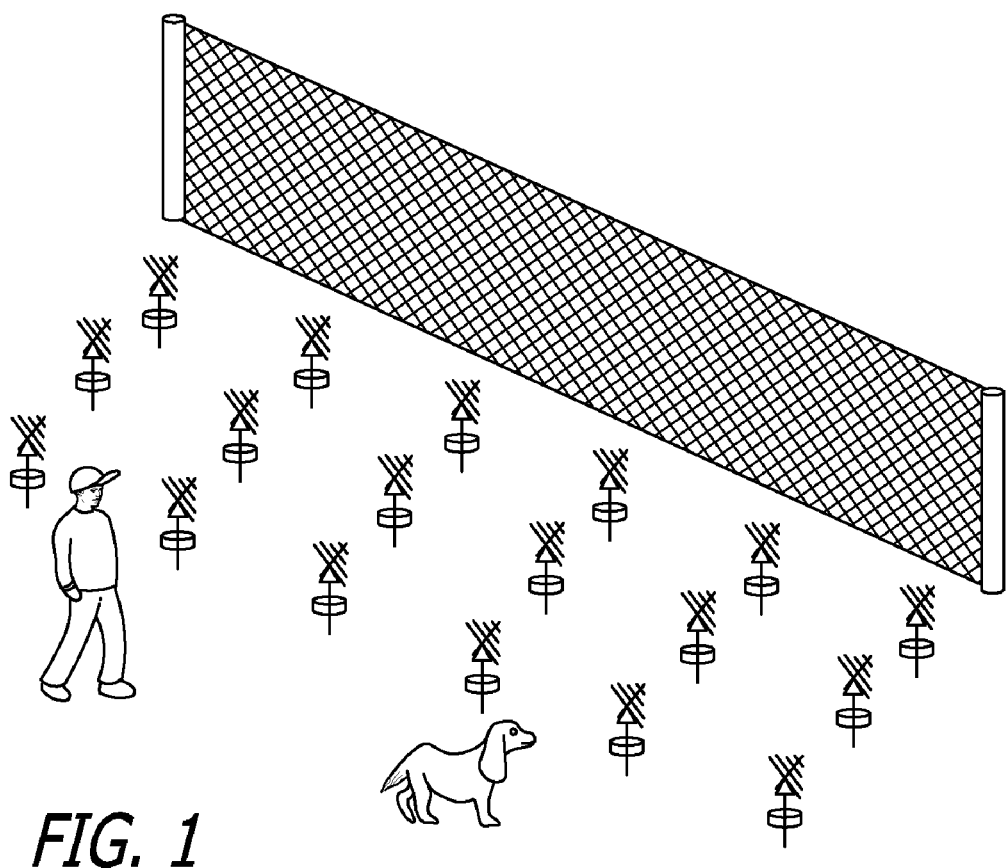
Figure 2:
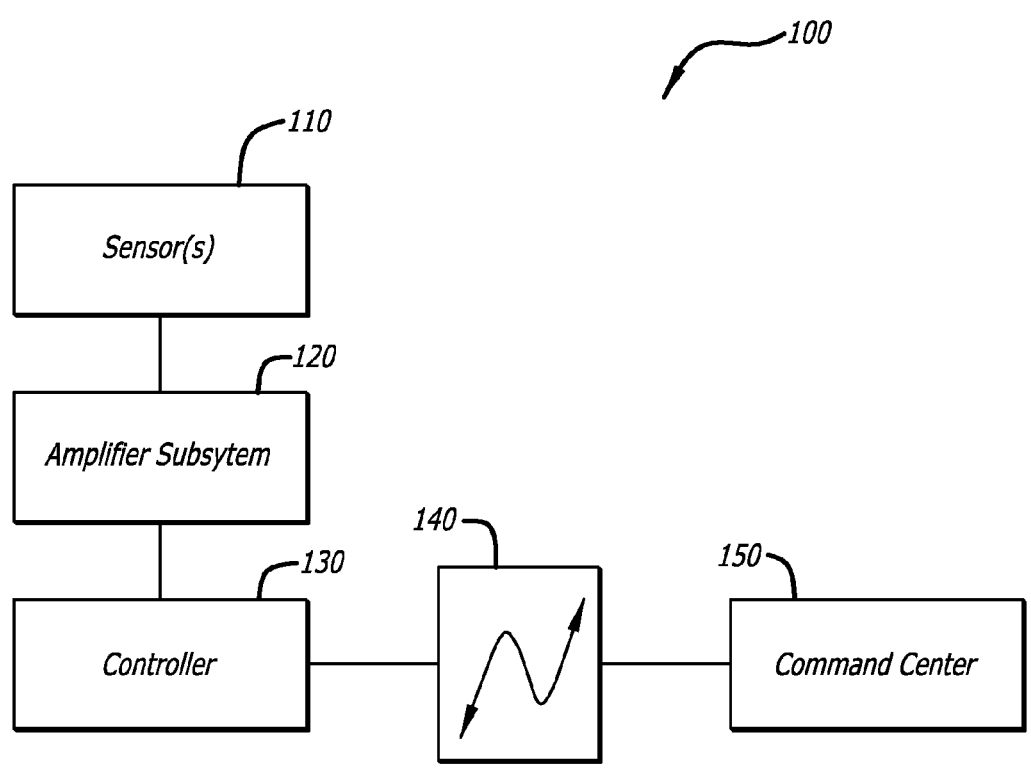
Figure 3A:
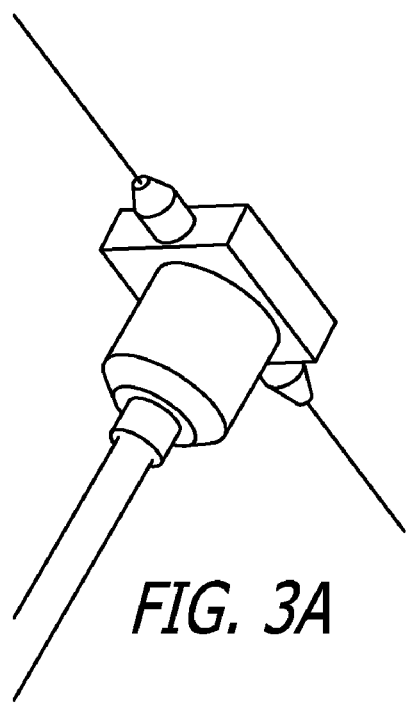
Figure 3B:
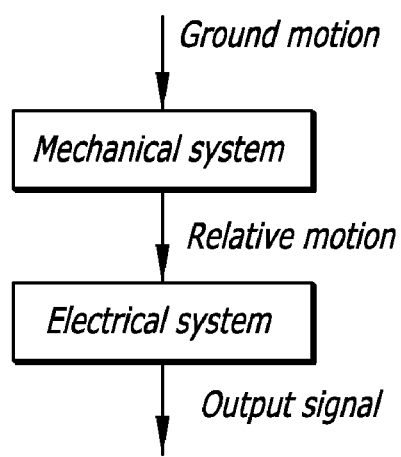
Figure 3C:
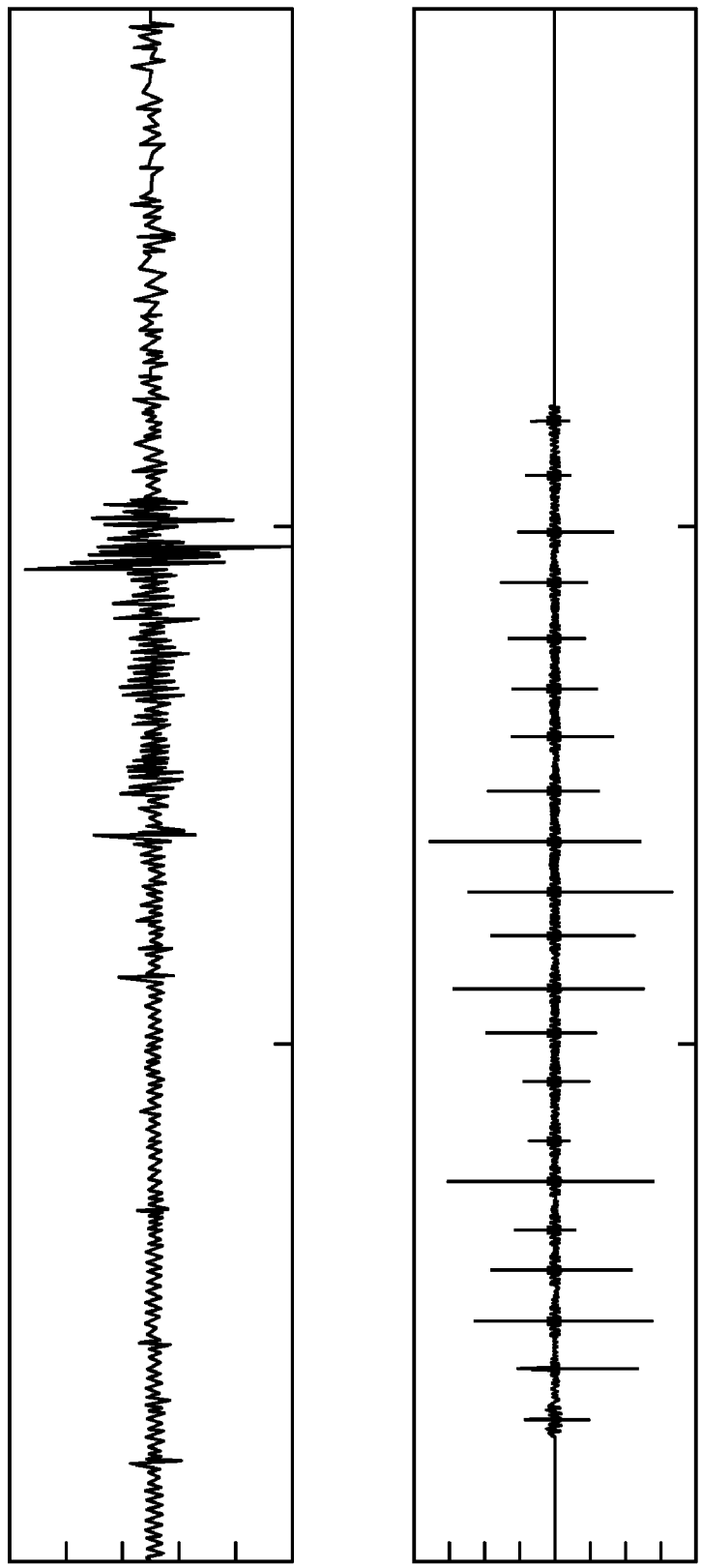

| | | | |
|---|---|---|---|
| 6,643,627 | B2 | 11/2003 | Liaw et al. |
| 6,798,715 | B2 | 9/2004 | Harmon et al. |
| 6,914,854 | B1 | 7/2005 | Heberley et al. |
| 6,944,590 | B2 | 9/2005 | Deng et al. |
| 7,203,132 | B2 | 4/2007 | Berger |
| 7,420,878 | B2 | 9/2008 | Holmes et al. |
| 7,558,156 | B2 | 7/2009 | Vook et al. |
| 2007/0120668 | A1* | 5/2007 | Boyd et al. ............ 340/565 |
| 2008/0106403 | A1 | 5/2008 | Voglewede et al. |
| 2008/0234983 | A1 | 9/2008 | Leigh et al. |
| 2009/0115635 | A1 | 5/2009 | Berger et al. |
| 2009/0201146 | A1 | 8/2009 | Lundeberg |
| 2010/0260011 | A1 | 10/2010 | Berger et al. |
| 2010/0268671 | A1 | 10/2010 | Berger et al. |
| 2011/0169664 | A1 | 7/2011 | Berger et al. |
| 2011/0172954 | A1 | 7/2011 | Berger et al. |

FOREIGN PATENT DOCUMENTS

| | | |
|---|---|---|
| WO | 2010118233 A2 | 10/2010 |

OTHER PUBLICATIONS

Figueiredo, M. A. F. et al. Unsupervised Learning of Finite Mixture Models. Pattern Analysis and Machine Intelligence, IEEE Transactions on Pattern Analysis and Machine Intelligence, vol. 24, No. 3, pp. 381-396, Mar. 2002.

Gibson, D. P. et al. Quadruped Gait Analysis Using Sparse Motion Information. Image Processing, 2003. ICIP 2003. Proceedings. 2003 International Conference, pp. III-333-336, pp. 14-17, Sep. 2003.

Hannuna, S.L. et al. Identifying Quadruped Gait in Wildlife Video. In International Conference on Image Processing, Sep. 2005, pp. 713-716.

Houston, K. et al. Spectrum Analysis Techniques for Personnel Detection Using Seismic Sensors. Proceeding of SPIE, vol. 5090, pp. 162-173, 2003.

Liaw, J-S. et al. Dynamic Synapse: A New Concept of Neural Representation and Computation. Hippocampus, 1996, 6, 591-600.

Mazarakis, G. P. et al. A Prototype Sensor Node for Footstep Detection. In Wireless Sensor Networks, 2005, Proceedings of the Second European Workshop on, Jan. 31-Feb. 2, 2005; pp. 415-418.

Pakhomov, A. et al. A Novel Method for Footstep Detection with an Extremely Low False Alarm Rate. Proceedings of SPIE, 5090, pp. 186-193, Apr. 2003.

Park, C. B. et al. Seismic Investigation of Pavement by MASW Method—Geophone Approach. Publication of Kansas Geological Survey, Lawrence, Kansas; Proceedings of the SAGEEP 2001, Denver, Colorado, RBA-6, http://www.kgs.ku.edu/Geophysics2/Pubs/Pubs/PAR-01-03.pdf.

Sabatier, J. M. et al. A Review of Human Signatures in Urban Environments Using Seismic and Acoustic Methods. Technologies for Homeland Security, 2008 IEEE Conference, pp. 215-220, May 12-13, 2008.

Succi, G. et al. Footstep Detection and Tracking. Proceedings of the SPIE, vol. 4393, pp. 22-29, 2001.

Zhang, Z. et al. Acoustic Micro-Doppler Gait Signatures of Humans and Animals 41st Annual Conference on Information Sciences and System, pp. 627-630, Mar. 14-16, 2007.

Park, et al. Protecting Military Perimeters from Approaching Human and Vehicle Using Biologically Realistic Dynamic Synapse Neural Network. Technologies for Homeland Security, 2008, IEEE Conference on , vol., No., pp. 73-78, May 12-13, 2008.

International Search Report and Written Opinion, dated Mar. 17, 2009 (ISA-US), for PCT Application No. PCT/US08/078829 (Published as WO2009/046359), filed Oct. 3, 2008, entitled "Detection and Classification of Running Vehicles Based on Acoustic Signatures," Berger et al. inventors.

International Search Report and Written Opinion, dated Oct. 27, 2010 (ISA-Kipo), for P.C.T. Application No. PCT/US2010/030394, filed Apr. 8, 2010 (Published as WO 20101118233), entitled "Cadence Analysis of Temporal Gait patterns for Seismic Discrimination," Berger et al., inventors.

Office Action, dated Feb. 2, 2011, for U.S. Appl. No. 12/245,564, entitled "Detection and Classification of Running Vehicles Based on Acoustic Signatures," Berger et al., inventors.

Billings, S.A. et al. 1986. Correlation Based Model Validity Tests for Nonlinear Models. International Journal of Control, 1986, vol. 44, No. 1, pp. 235-244.

De Vries, J. 2004. A Low Cost Fence Impact Classification System with Neural Networks. In IEEE Africon 2004, ISBN No. 0-7-83-8605-1, pp. 131-136.

Maki, M.C. et al. 2003. IntelliFIBER (TM): Fiber Optic Fence Sensor Developments. In IEEE 37th Annual International Carnahan Conference on Security Technology, Oct. 14-16, 2003, ISBN No. 0-7803-7882-2, pp. 17-22.

Marquardt, D.W. 1963. An Algorithm for Least-Squares Estimation of Nonlinear Parameters. J. Soc. Indust. Appl. Math, Jun. 1963, vol. 11, No. 2, pp. 431-441.

Park, H.O. et al. 2009. Cadence Analysis of Temporal Gait Patterns for Seismic Discrimination Between Human and Quadruped Footsteps. 2009 IEEE International Conference on Acoustics, Speech, and Signal Processing, Proceedings, Apr. 19-24, 2009, Taipei, Taiwan, pp. 1749-1752.

Peck, L. et al. 2007. Seismic-Based Personnel Detection. Proc. 41st Annual IEEE International Carnahan Conference on Security Technology (ISBN 1-4244-1129-7), 2007, pp. 169-175.

Thiel, G. 2000. Automatic CCTV Surveillance: Towards the Virtual Guard. In IEEE AES Systems Magazine, Jul. 2000, pp. 3-9.

* cited by examiner

SYSTEMS AND METHODS FOR SECURITY BREACH DETECTION

CROSS REFERENCE TO RELATED APPLICATION

This application claims the benefit of priority under 35 U.S.C. §119(e) from commonly owned U.S. provisional patent application Ser. No. 60/977,273 (the '273 provisional application"), entitled "Security Breach Detection And Localization Using Vibration Sensors," filed Oct. 3, 2007. The content of the '273 provisional application is incorporated herein by reference in its entirety as though fully set forth.

STATEMENT REGARDING FEDERALLY SPONSORED RESEARCH

This invention has been made with government support under Office of Naval Research Grant Nos. N00014-06-1-0117 and N00014-05-C-0435; and ONR/ARO/SD Grant No. SD 121905, awarded by the United States Government. The government has certain rights in the invention.

BACKGROUND

A number of applications may require that approaching human or vehicles threats, and any suspicious activity around a protected area, be detected. For example, suicide bombers or vehicles loaded with explosive material may have to be detected nearing a secured zone.

Human footsteps and approaching vehicles generate seismic waves which can be captured by seismic sensors. Seismic energy varies as a function of the weight of the vehicle or human, style of driving or walking, and type of substrate. An object moving near a secured zone acts as a source of seismic vibration which generates different type of surface waves (Rayleigh, P, and S, for example). These waves propagate at different speed and dissipate in different relative distances depending on the frequency characteristics of the seismic waves and the type of substrate.

In general, low frequency bands of the seismic waves have higher energy than higher frequency bands. Therefore, for the purpose of classification of vibration sources, relying on only low frequency features of the seismic wave results in a poor classification rate.

There is a need for systems and methods for detecting and reporting security breach events, that are more reliable and that provide better functionalities.

SUMMARY

A system for detecting and classifying a security breach may include at least one sensor configured to detect seismic vibration from a source, and to generate an output signal that represents the detected seismic vibration. The system may further include a controller that is configured to extract a feature vector from the output signal of the sensor and to measure one or more likelihoods of the extracted feature vector relative to set $\{b_i\}$ ($i=1, \ldots, i_{max}$) of breach classes $b_i$. The controller may be further configured to classify the detected seismic vibration as a security breach belonging to one of the breach classes $b_i$, by choosing a breach class within the set $\{b_i\}$ that has a maximum likelihood.

BRIEF DESCRIPTION OF THE DRAWINGS

The figures depict one or more implementations in accordance with the present disclosure, by way of example only and not by way of limitations. The drawings disclose illustrative embodiments. They do not set forth all embodiments. Other embodiments may be used in addition or instead.

FIG. 1 illustrates an array of geophone sensors that detect seismic vibrations.

FIG. 2 is a block diagram of a system for detecting and classifying security breach events, according to an embodiment of the present disclosure.

FIG. 3A illustrates a perspective view of a geophone.

FIG. 3B is a functional diagram of the geophone illustrated in FIG. 3A

FIG. 3C illustrates the output voltage of the geophone illustrated in FIGS. 3A and 3B for a vehicle and for human footsteps.

FIG. 4 illustrates an amplifier subsystem, according to an embodiment of the present disclosure.

FIGS. 5A, 5B, and 5C illustrate exemplary feature spaces for background noise, human footstep, and vehicle, respectively, in one embodiment of the present disclosure.

FIG. 6 is a flowchart that illustrates exemplary acts for extracting a feature vector, according to an embodiment of the present disclosure.

FIG. 7 is a flowchart that illustrates exemplary acts for estimating GMM parameters, according to an embodiment of the present disclosure.

DETAILED DESCRIPTION

In the present disclosure, systems and methods are described for detecting and classifying vibrations that may be caused by security breach events. The source of the vibration may be a medium, a human, an animal, or a passenger vehicle, by way of example. The systems and methods described below may discriminate between one or more security breach events, and background noise. They may locally detect and recognize a security breach event and, upon detection of an incident, ship the results of recognition and/or raw data from the sensor to a main control station for logging of the event. For robust vibration source classification, different weighting functions may be employed in the spectrum domain in different frequency bands, in one embodiment. Gaussian Mixture Models (GMMs) and Viterbi decoding may be used to statistically model the signature of each of the vibration sources. A low noise pre-amplifier with variable gain and with a variable cut-off frequency filter is used to preprocess the output signals from the sensor.

FIG. 1 illustrates an array of seismic sensors that detect seismic vibrations. In order to detect security breaches without being exposed, the seismic sensors may be fabricated in a way as to be not noticeable or detectable by intruders. In addition, the seismic sensors may not generate an electromagnetic field or audio/visual signals which may expose them to the intruders. The seismic sensors may be small in size and may be easily hidden away from human visual inspection. In one embodiment, the sensors illustrated in FIG. 1 may be geophones. Geophones, further described below, are inexpensive sensors which provide easy and instant deployment as well as long range detection capability.

FIG. 2 is a block diagram of a system 100 for detecting and classifying security breach events, according to an embodiment of the present disclosure. In overview, the system 100 includes one or more sensors 110, an amplifier subsystem 120, and a controller 130. In the illustrated embodiment, geophones are used as sensors to convert mechanical vibrations to electrical signals, i.e. the sensors 110 are an array of geophone sensors. The amplifier subsystem 120 may be configured to amplify the output signals from the geophone sensors, and may include a preamplifier and a filter. The variable gain and frequency characteristics of the pre-amplifier may be changed manually or automatically within the hardware or software of the system 100. The system 100 may also include a wireless transmitter 140 that transmits, to a command center 150, data from the sensor and/or results of the detection and classification of security breach events.

In one exemplary embodiment, the controller 130 may be a microcontroller having 4 channels (12 bits) A/D (analog-to-digital). The output of the pre-amplifier may be sampled at 1000 kHz and a buffer of 3000 samples may be stored in the memory for processing. The sampling and processing of data may be multi-thread based (ping-pong), so as to guarantee real time processing and data acquisition. The microcontroller may have a speed sufficient to rapidly evaluate mathematical models of breach classes and calculate likelihoods.

In overview, the sensors 110 detect seismic vibration from a source, which may include, but are not limited to, biped (human), quadruped (animal), and vehicle (tracked vehicles, wheeled vehicle, train, airplane) sources. The sensors generate output signals that represent the detected seismic vibration. The controller extracts one or more feature vectors from the output signals. The controller computes the likelihoods of the extracted feature vector relative to set $\{b_i\}$ ($i=1, \ldots, i_{max}$) of breach classes $b_i$. The controller then classifies the source of the detected seismic vibration as a security breach belonging to one of the breach classes $b_i$, by choosing a breach class within the set $\{b_i\}$ that has a maximum likelihood.

The system 100 may use the wireless transmitter 140 to send results of classification and associated raw data from the sensors to the command center 150, upon detecting an event or receiving a request from the command center 150. In one embodiment, the baud rates of the wireless transmitter 140 may be set to 115,200 bps to ensure reliable communication between the sensors and command center. In one embodiment, the command center may change the parameters of pre-amplifier and of the breach classes, described further below. In one embodiment, the wireless sensors may be networked, for example through mesh networking, to cover larger areas with minimum power consumption.

The wireless transmitter 140 may be used as a connection between the sensors 110 and/or controller 130, on the one hand, and the command center 150, on the other, for the exchange of data and parameters. Since transmitter is battery powered, the transmitter is low-power. The receiver may be located in the command center 150 which may communicate with the sensors.

In one embodiment, the wireless transmitter 140 may have one or more of the following specifications: up to 100 mw power output; up to 100 meter in indoor/urban range; up to 1.6 km outdoor/RF line-of-sight range; 250 kbps RF data rate; up to 115.2 kbps interface data rate; 100 dbm receiver sensitivity; 12 direct sequence channels capacity; 65,000 network addresses available for each channel; DSSS (Direct Sequence Spread Spectrum) transmission; operating temperature of about −40 to about 75° C.; and a power down sleep mode.

Geophone sensors 110 are described in more detail, in conjunction with FIGS. 4A, 4B, and 4C. FIG. 4A illustrates a perspective view of a geophone, while FIG. 4B is a functional diagram of the geophone illustrated in FIG. 4A. FIG. 4C illustrates the output voltage of the geophone illustrated in FIGS. 4A and 4B for a vehicle and for human footsteps.

A geophone is a single axis seismometer that measures motion in the direction of its cylindrical axis. In typical near-surface deployments, a geophone may be packaged with a conical spike and buried a few inches underground to ensure good coupling with the motion of the earth. Ground motion may cause the hollow cylinder of a geophone to move with respect to the geophone housing. The motion of the cylinder can be measured by the interaction of the coil on the cylinder with the magnetic field of the permanent magnet inside the geophone.

Using Faraday's law, the following relation holds between the voltage across a coil and the change in flux through the coil with respect to time:

$$V_o = -\frac{\partial \varphi}{\partial t}$$
$$= -\frac{\partial \varphi}{\partial X}\frac{\partial X}{\partial t}$$
$$= -GX_r$$
$$= -GsX_r.$$

In the case of a geophone, the change in flux through the coil versus coil displacement, $\delta(\varphi)/\delta(X)$, is constant for small displacements. Therefore, the voltage across the coil is directly proportional to the velocity of the coil. Geophone manufacturers typically report the constant of proportionality, $G[V/(m/s)]$, known as the transduction constant or generator constant.

Figure 4:
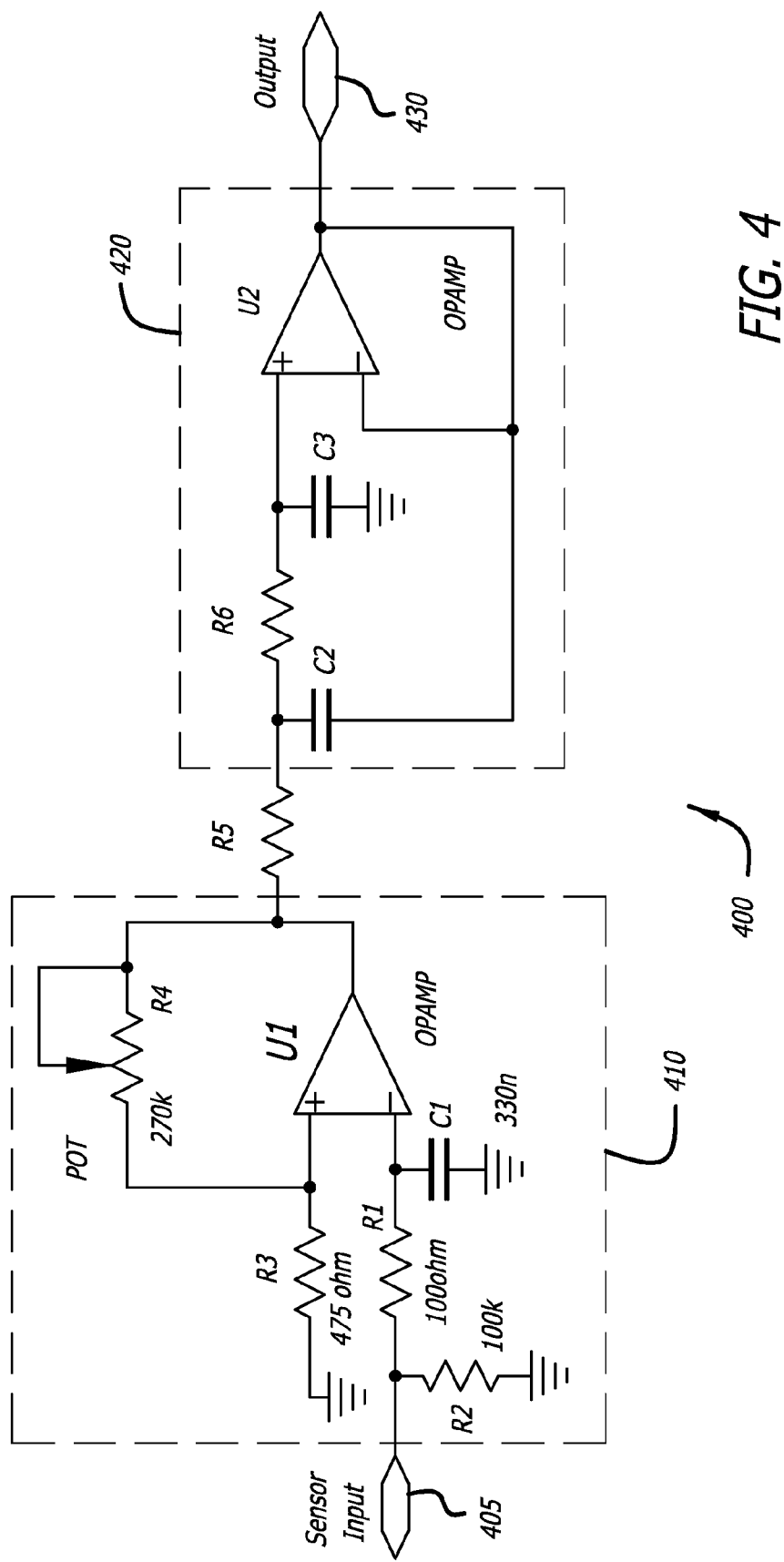

FIG. 4 illustrates an amplifier subsystem 400, according to an embodiment of the present disclosure, that amplifies a signal that enters an input 405 of the amplifier subsystem 400. The amplified signal comes out from an output 430 of the amplifier subsystem 400.

As described above, a moving object is a source of seismic vibration which generates different type of surface waves. Surface waves propagate at different speed and dissipate in different relative distances depending on the frequency characteristics of the seismic waves and the type of substrate. In one embodiment, the gains for the pre-amplifier 410 are adjusted depending on the substrate they are deployed in. The gains may be adjusted either within the hardware or remotely via the software. In one embodiment, the gains may be automatically and/or remotely adjusted by normalizing the energy level of the background noise signal. In this process, the controller 130 may receive frames of the background noise signal and may estimate energy. The gain factor may then be calculated to normalize the energy of the background noise signal.

In one embodiment, the filter 420 may have variable cutoff frequency, so that the cutoff frequency of the filter may be adjusted depending on the frequency characteristics of the different applications. For example, in an application in which only footstep recognition is implemented, the bandpass range of the filter 420 may be adjusted for a range of about 0.1 Hz to about −50 Hz. In an application in which a discrimination of footstep vs. vehicle is implemented, the filter may be tuned for 0.1-200 Hz. In one embodiment, the frequency range of the filter may be adjusted remotely. The pre-amplifier may be a very low noise pre-amplifier that is resilient to 60 Hz noise. The pre-amplifier may be a low power preamplifier that is waterproof and adapted to working harsh environments/temperature.

Figure 5A:
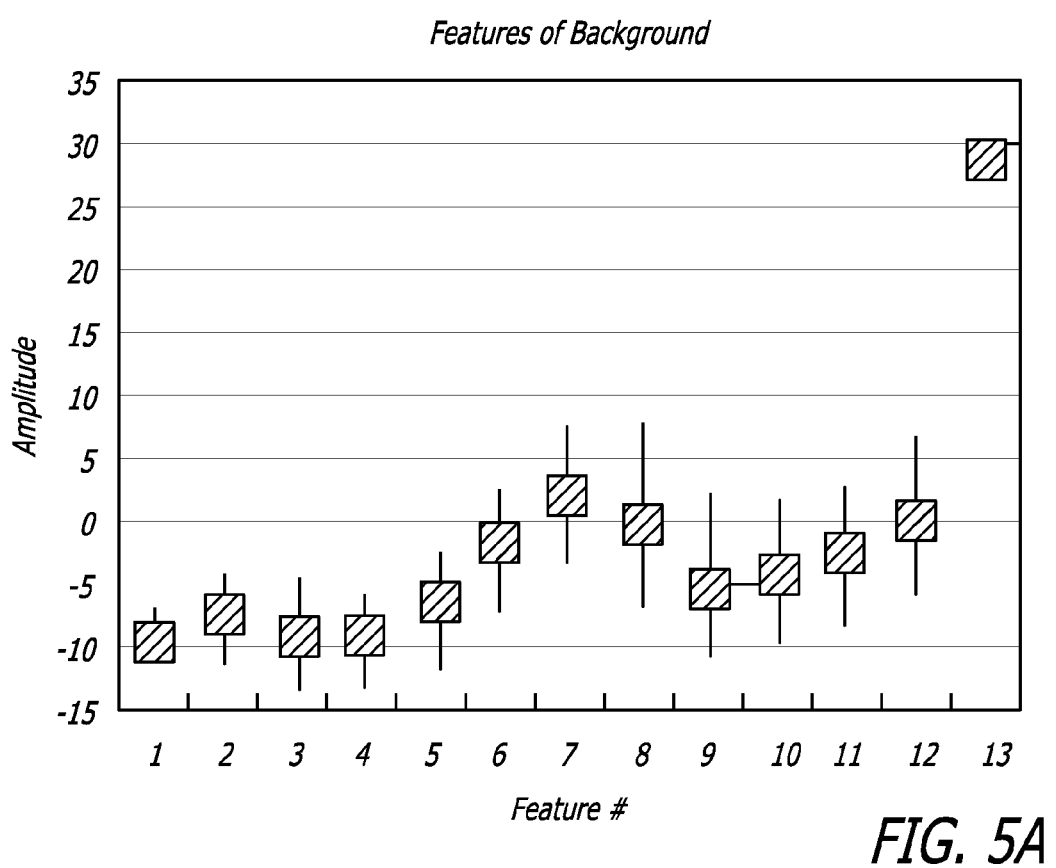
Figure 5B:
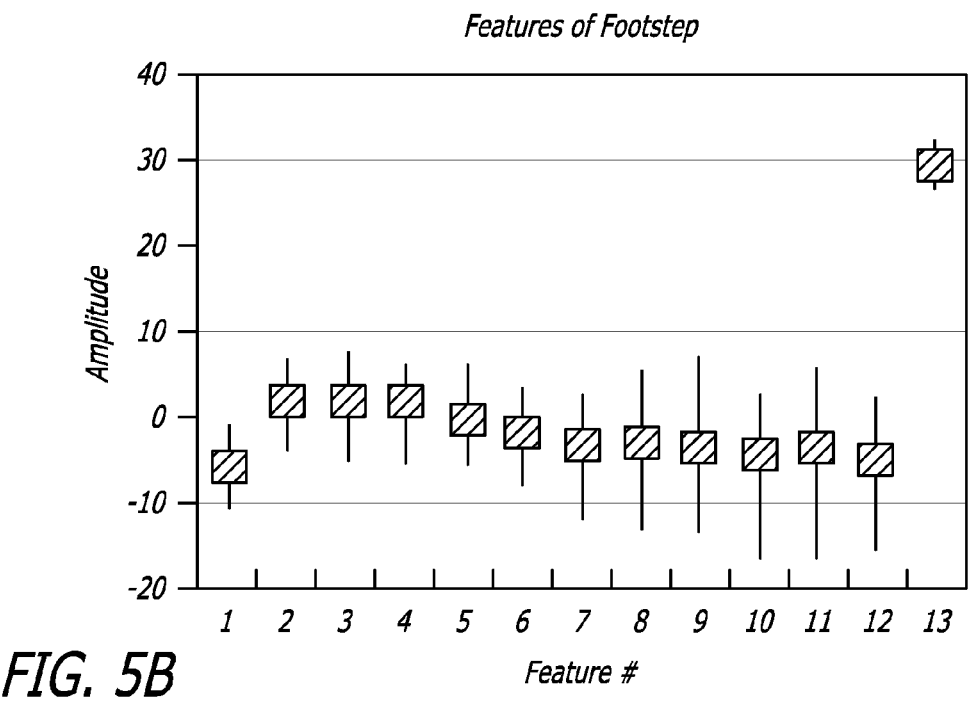
Figure 5C:
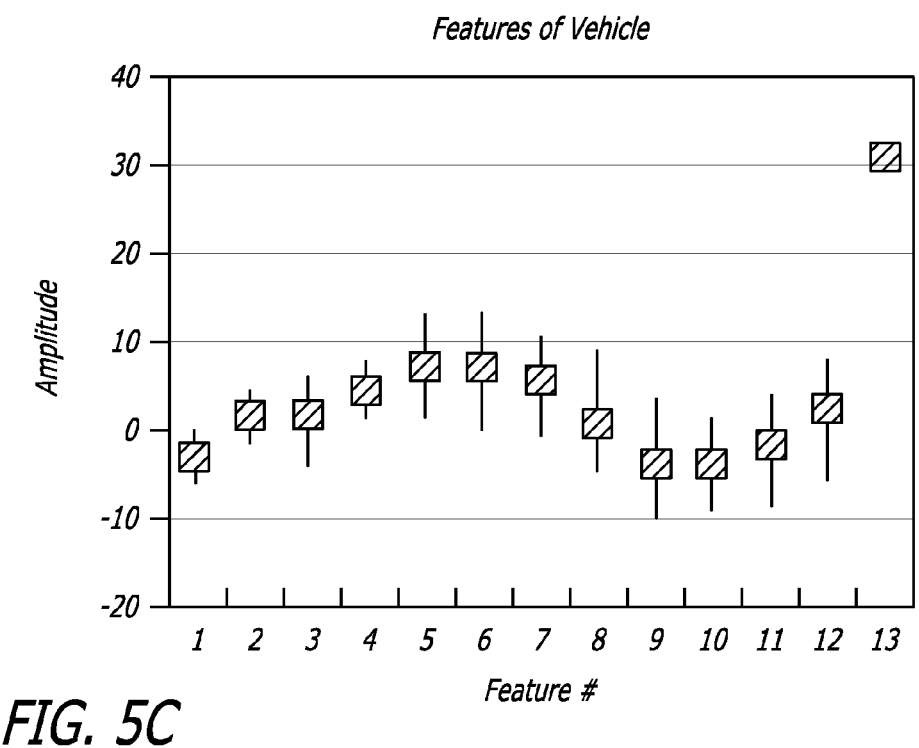

FIGS. 5A, 5B, and 5C illustrate exemplary feature spaces for background noise, human footstep, and vehicle, respectively, in one embodiment of the present disclosure. In the illustrated embodiment, the system 100 may be configured to recognize human footsteps and vehicles as security breach events, and to reject other ground vibrations (e.g. vibrations caused by dropping an object or quadruped animals footsteps) as background noise. In this embodiment, the controller 130 may, as a first step in the recognition process, extract features which represent the time domain signal.

Figure 6:
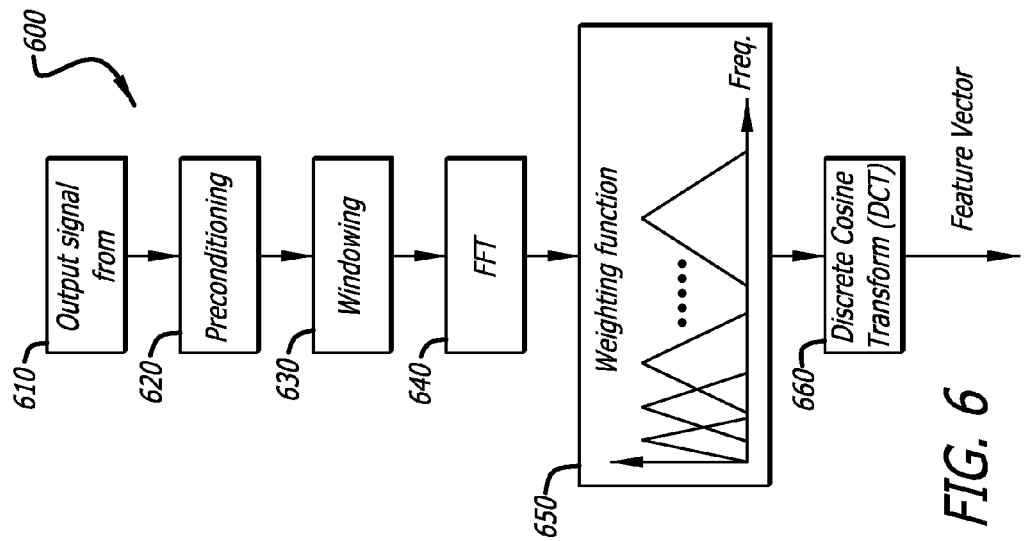

FIG. 6 is a flowchart that illustrates exemplary acts in a process 600 for extracting a feature vector, according to an embodiment of the present disclosure. In this embodiment, frequency based features are employed, with weighting functions at different frequency bands. To extract the feature vectors, a FFT (Fast Fourier Transform) of a 400 msec window with a 50% overlap is estimated, and energy of each 12 frequency bands (in logarithmic scale) are calculated. Then the energy of each band is calculated and discrete cosine transform is applied.

In the illustrated embodiment, the process 600 may include one or more of the following acts: an act 610 of receiving an output signal from the geophone; an act 620 of preconditioning the output signal; an act 630 of windowing the output signal; an act 640 of applying a FFT (Fast Fourier Transform) to the windowed signal; an act 650 of applying to the signal a plurality of weighting functions at different frequency bands, and calculating the energy of each of the bands; and an act 660 of applying a discrete cosine transform to the weighted frequency signals.

In one embodiment, Gaussian Mixture Models (GMMs) and Viterbi decoding may be used to statistically model the signature of each of the vibration sources that are being considered for recognition. In this embodiment, each segment of vibration signal from the geophone(s) may be represented by a sequence of feature vectors O, defined as O=$o_1, o_2, \ldots, o_T$ where $o_t$ is the feature vector observed at time t. In this embodiment, the problem of recognizing security breach can then be formulated as that of computing:

$$\arg\max_i \{P(b_i|O)\},$$

where $b_i$ is the $i^{th}$ member of breach class set $\{b_i\}$. In one embodiment, the set $\{b_i\}$ may include the following breach classes: vehicle, footstep, and background noise.

While $\arg\max_i \{P(b_i|O)\}$ is not computable directly, Bayes' rule may be used, to obtain:

$$P(b_i|O)=P(O|b_i)P(b_i)/P(O).$$

The most probable breach thus depends only on the likelihood $P(O|b_i)$ if the prior probabilities $P(b_i)$ are known or constant.

Because estimation of the joint conditional probability $P(O|b_i)$ from examples (training samples) is not practically feasible, GMMs may be used, in one embodiment of the present disclosure. In this embodiment, it is assumed that a model of each class of breach is parametric, and a GMM parametric model is adopted for the breach classes. In this way, the problem of estimating the breach class conditional densities $P(O|b_i)$ is replaced by estimating the GMMs parameters, thereby making the estimation of $P(O|b_i)$ from data feasible. Using GMM parametrization, $P(b_i|O)$ may be written as $$P(b_i|O) = \sum_{m=1}^{M} C_i N(O; \mu_m; \Sigma_m).$$

In the above equation, $N(O; \mu_m; \Sigma_m$ is a multivariate Gaussian distribution, $C_i$ are constants, $\mu_m$ are mean vectors, and $\Sigma_m$ are covariance matrices. $C_i$, $\mu_m$, and $\Sigma_m$ are the unknown GMM parameters. In one embodiment, the controller 130 may be configured to estimate the unknown GMM parameters $C_i$, $\mu_m$, and $\Sigma_m$ using one of: a Baum-Welch re-estimation; an EM (expectation-maximization) algorithm; and an MLE (maximum likelihood estimation) algorithm.

Figure 7:
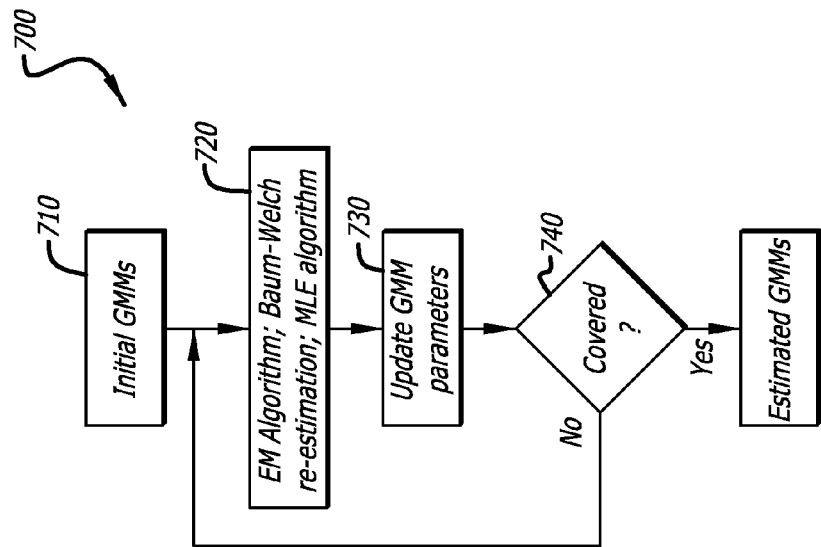

FIG. 7 is a flowchart that illustrates exemplary acts for a process 700 estimating GMM parameters, according to an embodiment of the present disclosure. In the embodiment illustrated in FIG. 7, the process 700 may include one or more of the following acts: an act 710 of inputting initial GMMs; an act 720 of using Baum-Welch re-estimation, an EM algorithm, or an MLE algorithm to estimate the unknown GMM parameters; an act 730 of updating the initial GMMs; and an act 740 of determining whether the GMM parameters have converged, so as to repeat the acts 720 and 730 until the GMM parameters converge.

The controller 130 may include a processing system configured to implement the methods, systems, and algorithms described in the present disclosure. The methods and systems in the present disclosure are not described with reference to any particular programming language. It will be appreciated that a variety of programming languages may be used to implement the teachings of the present disclosure. The processing system may be selectively configured and/or activated by a computer program stored in the computer. Such a computer program may be stored in any computer readable storage medium, including but not limited to, any type of disk including floppy disks, optical disks, CD-RIOMs, and magnetic-optical disks, read-only memories (ROMs); random access memories (RAMs), EPROMs, EEPROMS, magnetic or optical cards, or any type of media suitable for storing electronic instructions. The methods, algorithms, and systems presented herein are not inherently related to any particular computer, processor or other apparatus. Various general purpose systems may be used with different computer programs in accordance with the teachings herein. Any of the methods, systems, and algorithms described in the present disclosure may be implemented in hard-wired circuitry, by programming a general purpose processor, a graphics processor, or by any combination of hardware and software.

In sum, methods and systems have been described for detecting, classifying, and reporting security breach. Applications of the systems and methods described in the present disclosure include, but are not limited to: performing perimeter protection in national, agricultural, airport, prison, and military sites, residential areas, and oil pipe lines; preventing accidents in danger zones such as construction sites, railways and airport runways; and discriminating between different sources of seismic vibration in the above applications, the different sources including biped (human), quadruped (animal), and vehicle (tracked vehicles, wheeled vehicle, train, airplane) sources.

Various changes and modifications may be made to the above described embodiments. The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A system for detecting and classifying a security breach, the system comprising:
   at least one sensor configured to detect seismic vibration from a source, and to generate an output signal that represents the detected seismic vibration; and
   a controller configured to extract a feature vector from the output signal of the sensor and to compute one or more likelihoods of the extracted feature vector relative to set $\{b_i\}$ ($i=1, \ldots, i_{max}$) of breach classes $b_i$, the controller further configured to classify the source of the detected seismic vibration as a security breach belonging to one of the breach classes $b_i$ by choosing a breach class within the set $\{b_i\}$ that has a maximum likelihood relative to the extracted feature vector.

2. The system of claim 1,
   wherein the breach classes $b_i$ comprise at least one of: a moving vehicle, a human footstep, and background noise.

3. The system of claim 1, wherein the controller is further configured to extract the feature vector from the output signal by applying a Fourier transform to the output signal so as to convert the output signal from a time domain signal into a frequency domain signal; applying to the converted signal a plurality of weighting functions at different frequency bands; calculating energy of each of the bands; and applying a discrete cosine transform to the weighted frequency signals.

4. The system of claim 2,
   wherein the controller is further configured to input and store a time sequence O of feature vectors $o_t(_{t=1, \ldots, T})=o_1, o_2, \ldots, o_T$, where $o_t$ represents a feature vector observed at a time t, and the time sequence O represents one or more segments of the output signal of the sensor; and
   wherein a mathematical formulation for the likelihood that the extracted feature vector is a member $b_i$ of a breach class set $\{b_i\}$ comprises:

$$\arg\max_i\{P(b_i|O)\},$$

where $P(b_i|O)$ represents the likelihood of $b_i$ given O.

5. The system of claim 4, wherein the controller is further configured to compute the likelihood $P(b_i|O)$ by using Bayes' rule given by:

$$P(b_i|O)=P(O|b_i)P(b_i)/P(O),$$

where
   $P(O|b_i)$ represents the likelihood of O given $b_i$,
   $P(b_i)$ represents the likelihood of $b_i$, and
   $P(O)$ represents the likelihood of O.

6. The system of claim 5, wherein the controller is further configured to compute the one or more likelihoods by adopting a GMM (Gaussian Mixture Model) parametric model for each member $b_i$ of the set $\{b_i\}$, and estimating one or more GMM parameters for said parametric model to compute a conditional density $P(O|b_i)$, where $P(O|b_i)$ represents the probability of O given $b_i$.

7. The system of claim 6, wherein a mathematical formulation of the likelihood $P(b_i|O)$, in the adopted GMM parametric model, comprises:

$$P(b_i|O) = \sum_{m=1}^{M} C_i N(O; \mu_m; \Sigma_m);$$

wherein
$N(O; \mu_m; \Sigma_m)$ is a multivariate Gaussian distribution,
$C_i$ are constants,
$\mu_m$ are mean vectors, and
$\Sigma_m$ are covariance matrices; and
wherein $C_i$, $\mu_m$, and $\Sigma_m$ are unknown GMM parameters.

8. The system of claim 7, wherein the controller is configured to estimate the unknown GMM parameters $C_i$, $\mu_m$, and $\Sigma_m$ using one of:
   a Baum-Welch re-estimation;
   an EM (expectation-maximization) algorithm; and
   an MLE (maximum likelihood estimation) algorithm.

9. The system of claim 8, wherein the controller is further configured to choosing the breach class within the set $\{b_i\}$ that has the maximum likelihood by performing Viterbi decoding.

10. The system of claim 1, further comprising an amplifier subsystem, wherein the amplifying subsystem includes a variable gain pre-amplifier configured to remotely adjust gain of the output signal by normalizing energy level of background and noise in the output signal.

11. The system of claim 10, wherein the amplifier subsystem further includes a bandpass filter having a variable frequency range and a variable cutoff frequency; and wherein the frequency range of the bandpass filter is remotely adjustable.

12. The system of claim 10, wherein the source of the seismic vibration is a human footstep, and wherein the frequency range of the bandpass filter is between about 0.1 Hz to about 50 Hz.

13. The system of claim 10, wherein the source of the seismic vibration comprises one of a human footstep and a moving vehicle, wherein the controller is further configured to discriminate between the human footstep and the moving vehicle, and wherein the frequency range of the bandpass filter is between about 0.1 Hz to about 200 Hz.

14. The system of claim 1, wherein the at least one sensor comprises a geophone.

15. The system of claim 1, wherein the at least one sensor comprises a wireless sensor network.

16. A method of detecting and identifying a security breach, comprising:
   detecting seismic vibration from a source, and generating an output signal that represents the detected seismic vibration;
   extracting a feature vector from the output signal;
   computing one or more likelihoods for the extracted feature vector relative to set $\{b_i\}$ ($i=1, \ldots, i_{max}$) of breach classes $b_i$; and
   classifying the source of the seismic vibration as a security breach belonging to one of the breach classes $b_i$ by choosing a breach class within the set $\{b_i\}$ that has a maximum likelihood.

17. The method of claim 16, wherein the act of extracting the feature vector from the output signal comprises the acts of:
applying a Fourier transform to the output signal so as to convert the output signal from a time domain signal into a frequency domain signal;
applying to the converted signal a plurality of weighting functions at different frequency bands;
calculating energy of each of the bands; and
applying a discrete cosine transform to the weighted frequency signals based on the computed likelihood, as one of a plurality of security breach events or as background noise.

18. The method of claim 16, wherein the act of computing the one or more likelihoods for the extracted feature vector relative to set $\{b_i\}$ (i=1, ..., $i_{max}$) of breach classes $b_i$ comprises the acts of:
adopting a GMM (Gaussian Mixture Model) parametric model for each member $b_i$ of the set $\{b_i\}$; and
estimating one or more GMM parameters for said parametric model to compute a conditional density $P(O|b_i)$, where $P(O|b_i)$ represents the probability of O given $b_i$.

19. The method of claim 18, wherein a mathematical formulation of the likelihood $P(b_i|O)$ in the adopted GMM parametric model comprises:

$$P(b_i | O) = \sum_{m=1}^{M} C_i N(O; \mu_m; \Sigma_m);$$

wherein
$N(O; \mu_m; \Sigma_m)$ is a multivariate Gaussian distribution,
$C_i$ are constants,
$\mu_m$ are mean vectors, and
$\Sigma_m$ are covariance matrices; and
wherein $C_i$, $\mu_m$ and $\Sigma_m$ are GMM parameters.

20. The method of claim 19, wherein the act of estimating the GMM parameters $C_i$, $\mu_m$ and $\Sigma_m$ comprises at least one of:
performing a Baum-Welch re-estimation;
using an EM (expectation-maximization) algorithm; and
using an MLE (maximum likelihood estimation) algorithm.

21. The method of claim 16, wherein the act of choosing the breach class within the set $\{b_i\}$ that has the maximum likelihood comprises the act of performing Viterbi decoding.

22. The method of claim 16, further comprising the act of wirelessly transmitting to a command center one of:
data representative of the detected seismic vibration; and
data representative of the classified security breach.

23. A computer-readable storage medium having stored therein computer-readable instructions for a processing system, wherein said instructions when executed by said processor cause said processing system to:
extracting a feature vector from an output signal of a seismic sensor;
compute one or more likelihoods for the extracted feature vector relative to a set $\{b_i\}$ (i=1, ..., $i_{max}$) of breach classes $b_i$; and
choose a breach class within the set $\{b_i\}$ that has a maximum likelihood.

24. A wireless transmitter, wherein the wireless transmitter is configured to:
receive from one or more geophones vibration data representative of seismic vibration detected by the geophones, and transmit the vibration data to a command center;
receive from a detecting system security breach data representative of a security breach that has been detected by the detecting system by extracting a feature vector from the vibration data detected by the geophones, and computing one or more likelihoods of the extracted feature vector relative to set {bi} (I=1, ..., imax) of breach classes bi, and choosing a breach class within the set {bi} that has a maximum likelihood relative to the extracted feature vector; and
transmit the security breach data to the command center.

25. The system of claim 1, further comprising a wireless transmitter configured to transmit, to a command center, one of:
data representative of the detected seismic vibration; and
data representative of the detected security breach.

* * * * *